(12) United States Patent
Mathison

(10) Patent No.: US 9,729,728 B2
(45) Date of Patent: Aug. 8, 2017

(54) MACHINE-LEARNED POLICIES FOR PCRF

(71) Applicant: Verizon Patent and Licensing Inc., Arlington, VA (US)

(72) Inventor: James Mathison, Warren, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 98 days.

(21) Appl. No.: 14/938,140

(22) Filed: Nov. 11, 2015

(65) Prior Publication Data

US 2017/0134590 A1    May 11, 2017

(51) Int. Cl.
*H04M 11/00*    (2006.01)
*H04M 15/00*    (2006.01)
*G06N 99/00*    (2010.01)

(52) U.S. Cl.
CPC .......... *H04M 15/66* (2013.01); *G06N 99/005* (2013.01)

(58) Field of Classification Search
CPC .............................. H04M 15/66; G06N 99/005
USPC .......................................... 455/406; 370/338
See application file for complete search history.

(56) References Cited

U.S. PATENT DOCUMENTS

2015/0282049 A1*   10/2015   Zhan .................... H04W 48/08
                                                                    455/414.1

* cited by examiner

*Primary Examiner* — Marcos Batista

(57) ABSTRACT

A network device receives business logic for Policy and Charging Rules Function (PCRF) policies and automatically generates a policy list based on the business logic. The network device receives signaling messages for user equipment and determines, based on the policy list, policy decisions that are responsive to each of the signaling messages. The network device further logs a decision flow associated with each of the signaling messages and corresponding policy decisions; determines, based on the logging, if the policy list can be structured more efficiently; and automatically updates the policy list when the policy list can be structured more efficiently.

20 Claims, 8 Drawing Sheets

MACHINE-LEARNED POLICIES FOR PCRF

BACKGROUND

A Policy and Charging Rules Function (PCRF) generally supports service data flow detection, policy enforcement and flow-based charging in Long-Term Evolution (LTE) networks. PCRF devices generally depend on PCRF policies to control network behavior. Network administrators, for example, define the policy structure and create individual policies or entries that control the PCRF behavior based on input variables.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

According to an implementation described herein, systems may receive business logic for Policy and Charging Rules Function (PCRF) policies and automatically generate a policy list based on the business logic. The systems may receive signaling messages for user equipment and determine, based on the policy list, policy decisions that are responsive to each of the signaling messages. The systems may further log a decision flow associated with each of the signaling messages and a corresponding policy decision; determine, based on the logging, if the policy list can be structured more efficiently; and automatically update the policy list when the policy list can be structured more efficiently.

Existing PCRFs depend on manually-created PCRF policies to control network behavior. For these existing PCRFs, network administrators for a particular service provider need to define the policy structure and create individual policies or entries that control the PCRF behavior based on input variables. These manual solutions are workable and efficient for small or simple deployments, but for service providers with a full suite of complex service options, such solutions have significant limitations. The policy creation task can be quite complex, and the choices made can lead to inefficient operation of the network. Even if the initial polices are defined in an efficient manner, the launch of new service options can cause the policies to become overly complex and inefficient. As a network evolves, replacing the complete set of existing policies and starting over might lead to more optimized policies, but this would require significant overhead, re-testing and operational impact. Furthermore, such improvement would be temporary if a service provider continues to roll out new service options on a regular basis.

Figure 1:
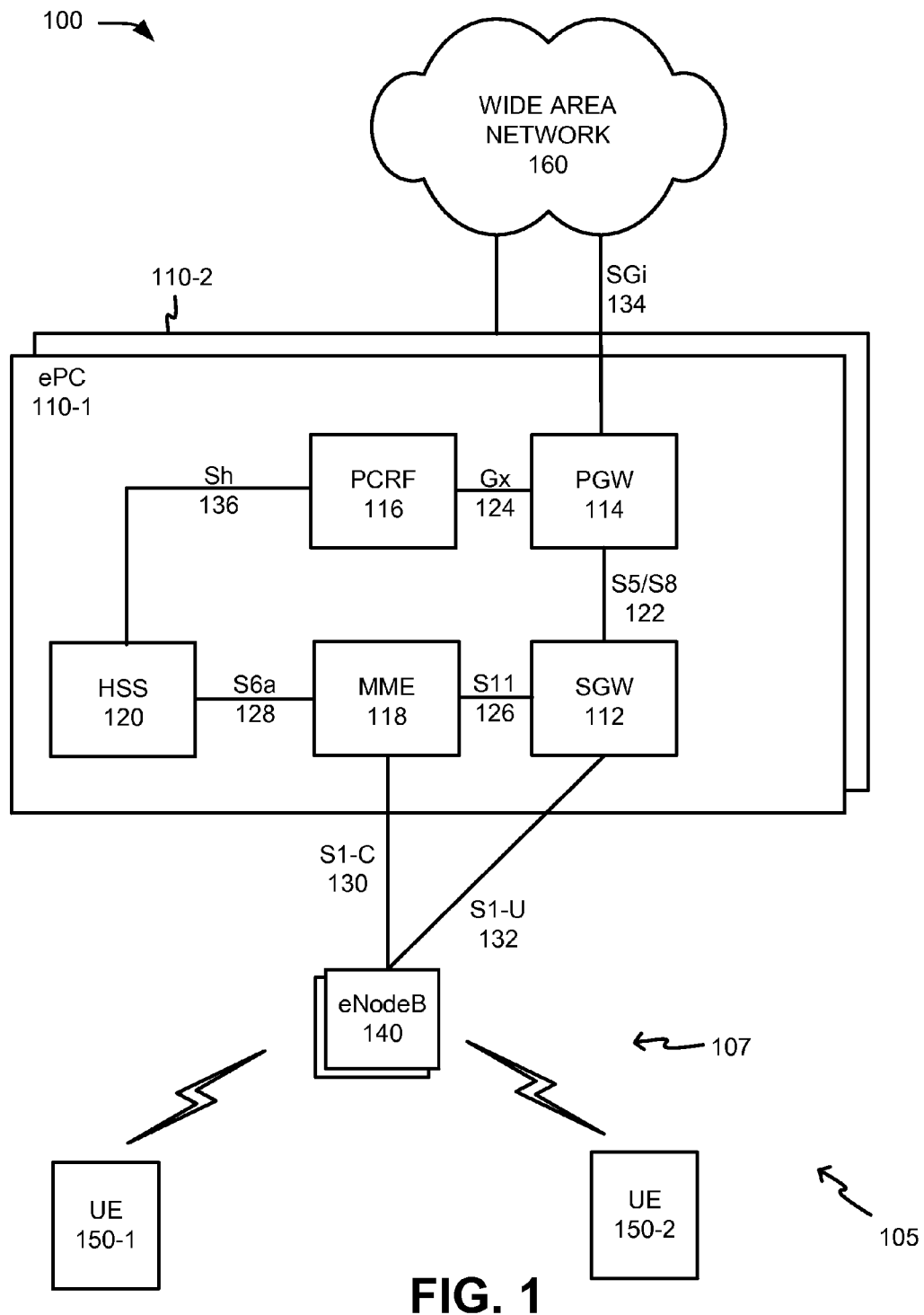
FIG. 1 is a block diagram of an exemplary network in which systems and methods described herein may be implemented.

FIG. 1 is a block diagram of an exemplary network 100 in which systems and methods described herein may be implemented. Network 100 may include wireless network 105, and a Wide Area Network (WAN) 160. While wireless network 105 is shown in the context of a Long Term Evolution (LTE) network, it should be appreciated that embodiments presented herein may operate in any appropriate wireless network(s).

Wireless network 105 may include one or more devices that are physical and/or logical entities interconnected via standardized interfaces. Wireless network 105 provides wireless packet-switched services and wireless Internet Protocol (IP) connectivity to mobile devices to provide, for example, data, voice, and/or multimedia services.

Wireless network 105 may further include one or more mobile devices, such as, for example, User Equipment (UEs) 150-1 and 150-2 (as used herein, collectively referred to as "UE 150" and generically as "UE 150"). Wireless network 105 may include one or more evolved Packet Cores (EPC) 110 and evolved Universal Mobile Telecommunications System (UMTS) Terrestrial Radio Access Networks (eUTRAN) 107.

The EPC 110 may include one or more serving gateways (SGW) 112, packet data network (PDN) gateways (PGW) 114, Policy and Charging Rules Function (PCRF) devices 116 (also referred to herein simply as "PCRF 116"), mobility management entity (MME) devices 118, and home subscriber server (HSS) devices 120. The eUTRAN 107 may include one or more base stations, such as, for example, eNodeB 140.

It is noted that FIG. 1 depicts a representative networking system 100 with exemplary components and configuration shown for purposes of explanation. Other embodiments may include additional or different network entities in alternative configurations than those which are shown in FIG. 1.

Further referring to FIG. 1, each eNodeB 140 may include one or more devices and other components having functionality that allows UE 150 to wirelessly connect to eUTRAN 107. eNodeB 140 may interface with EPC 110 via an S1 interface, which may be split into a control plane S1-C interface 130 and a data plane S1-U interface 132. S1-C interface 130 may interface with MME device 118. S1-C interface 130 may be implemented, for example, with a protocol stack that includes a Network Access Server (NAS) protocol and/or Stream Control Transmission Protocol (SCTP). S1-U interface 132 may interface with SGW 112 and may be implemented, for example, using a General Packet Radio Service Tunneling Protocol version 2 (GTPv2). eNodeB 140 may communicate with other eNodeBs via an X2 interface (not shown). The X2 interface may be implemented, for example, with a protocol stack that includes an X2 application protocol and SCTP.

SGW 112 may provide an access point to and from UE 150, may handle forwarding of data packets for UE 150, and may act as a local anchor point during handover procedures between eNodeBs 140. SGW 112 may interface with PGW 114 through an S5/S8 interface 122. S5/S8 interface 122 may be implemented, for example, using GTPv2.

PGW 114 may function as a gateway to WAN 160 through an SGi interface 134. WAN 160 may include, for example, an IP Multimedia Subsystem (IMS) network, which may provide voice and multimedia services to UE 150, based on Session Initiation Protocol (SIP). In some cases, a particular UE 150, while connected to a single SGW 112, may be connected to multiple PGWs 114, one for each packet network with which UE 150 communicates.

PCRF 116 provides policy control decision and flow based charging control functionalities. PCRF 116 may include a network device, server device, or a distributed component. PCRF 116 may provide network control regarding service data flow detection, gating, QoS and flow based charging, etc. PCRF 116 may determine how a certain service data flow shall be treated, and may ensure that traffic mapping and treatment is in accordance with a user's subscription profile. According to implementations described herein, PCRF 116 may generate and update policies to accomplish these tasks based on business logic provided to PCRF 116. PCRF 116 may communicate with PGW 114 using a Gx interface 124. Gx interface 124 may be implemented, for example, using a Diameter protocol.

MME device 118 may implement control plane processing for wireless network 105. For example, MME device 118 may implement tracking and paging procedures for UE 150, may activate and deactivate bearers for UE 150, may authenticate a user of UE 150, and may interface to non-LTE radio access networks. A bearer may represent a logical channel with particular QoS requirements, as will be discussed in more detail below. MME device 118 may also select a particular SGW 112 for a particular UE 150. A particular MME device 118 may interface with other MME devices (not shown) in EPC 110 and may send and receive information associated with UEs, which may allow one MME device to take over control plane processing of UEs serviced by another MME device, if the other MME device becomes unavailable.

MME device 118 may communicate with SGW 112 through an S11 interface 126. S11 interface 126 may be implemented, for example, using GTPv2. S11 interface 126 may be used to create and manage a new session for a particular UE 150. S11 interface 126 may be activated when MME device 118 needs to communicate with SGW 112, such as when the particular UE 150 attaches to EPC 110, when bearers need to be added or modified for an existing session for the particular UE 150, when a connection to a new PGW 114 needs to created, or during a handover procedure (e.g., when the particular UE 150 needs to switch to a different SGW 112).

HSS device 120 may store information associated with UEs 150 and/or information associated with users of UEs 150. For example, HSS device 120 may store user profiles, such as a Subscriber Profile Repository (SPR), that include authentication and access authorization information. MME device 118 may communicate with HSS device 120 through an S6a interface 128. S6a interface 128 may be implemented, for example, using a Diameter protocol. PCRF 116 may communicate with HSS device 120 through an Sh interface 136 to obtain a subscriber profile that identifies services (e.g., a prepaid voice service, a prepaid data service, a postpaid voice service, a postpaid data service, a prepaid VoIP service, etc.) to which a user, associated with UE 150, has subscribed. The subscriber profile may also identify particular services (e.g., an RTR service, a UC service, etc.), to which the user has subscribed, that are to be provided when an online charging action is to be performed.

UE 150 may include any mobile device configured to communicate with eNodeB 140 via wireless signals. For example, UE 150 may include a portable communication device (e.g., a mobile phone, a smart phone, a phablet device, a global positioning system (GPS) device, and/or another type of wireless device); a telephone terminal; a personal computer or workstation; a server device; a laptop, tablet, or another type of portable computer; a media playing device; a portable gaming system; and/or any type of mobile device with wireless communication capability.

WAN 160 may include any type of wired or wireless network covering larger areas. For example, WAN 160 may include a metropolitan area network (MAN), a Public Switched Telephone Network (PSTN), an ad hoc network, an intranet, the Internet, a fiber optic-based network, a wireless network, and/or a combination of these or other types of networks. WAN 160 may be an IP based network or utilize Multi-Protocol Label Switching (MPLS), and may include a mesh network (e.g., IEEE 801.11s) and/or or a WiMAX network (e.g., IEEE 802.16). WAN 160 may include one or more circuit-switched networks and/or packet-switched networks.

Still referring to FIG. 1, multiple elements in EPC 110 perform various functions for implementing QoS and policy management. As noted above, PCRF 116 may be the policy server in EPC 110. PCRF 116 may take the available network information and operator-configured policies to create service session-level policy decisions. The decisions, known as Policy and Charging Control (PCC) rules, are forwarded to a policy and charging enforcement function (PCEF) (not shown) located in PGW 114. The PCEF enforces policy decisions by establishing bearers, mapping service data flows to bearers, and performing traffic policing and shaping.

While FIG. 1 shows exemplary components of network 100, in other implementations, network 100 may include fewer components, different components, differently arranged components, or additional components than depicted in FIG. 1. Additionally or alternatively, one or more components of network 100 may perform functions described as being performed by one or more other components.

Figure 2:
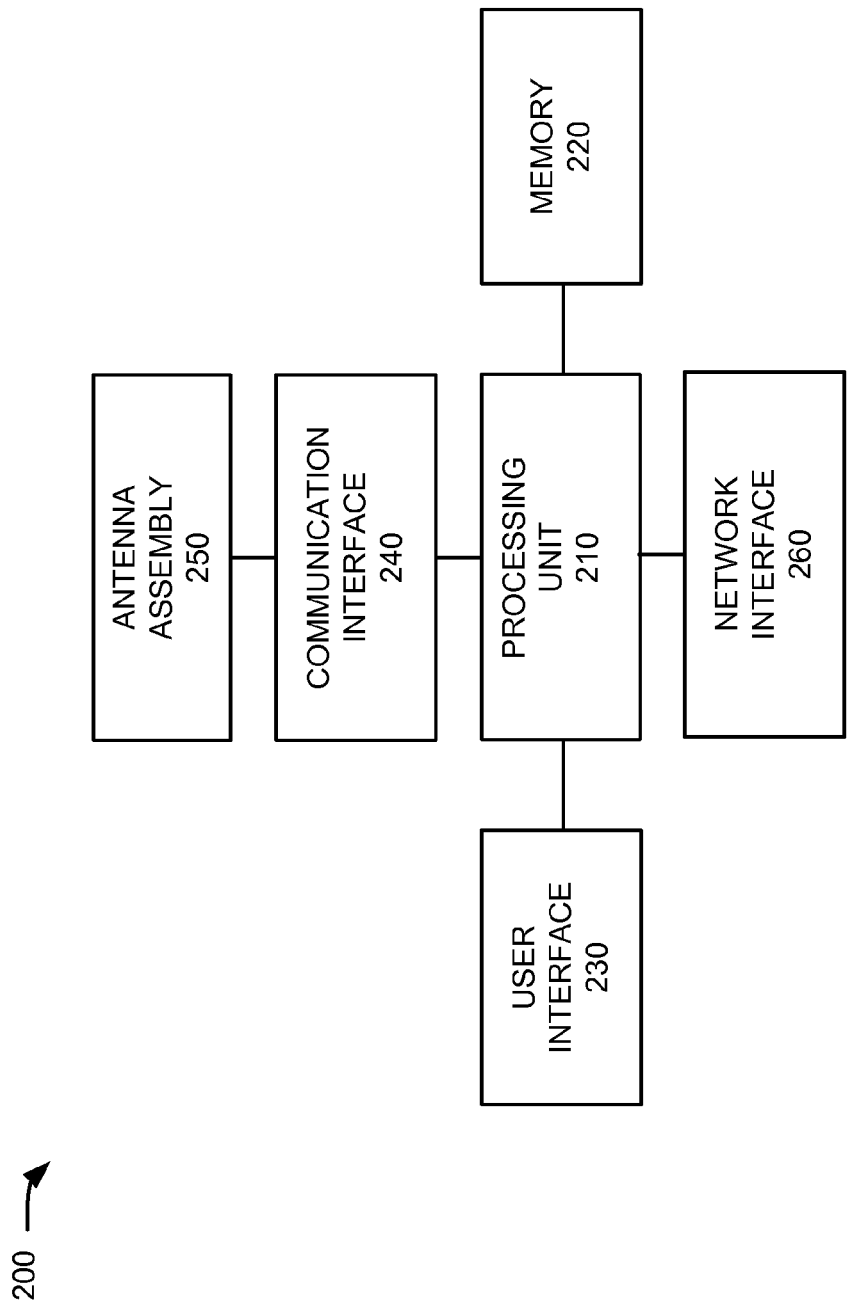
FIG. 2 is a block diagram showing exemplary components of a base station according to an embodiment.

FIG. 2 is a block diagram showing exemplary components of a base station 200 (e.g., eNodeB 140) according to an embodiment. As shown in FIG. 2, base station 200 may include a processing unit 210, a memory 220, a user interface 230, a communication interface 240, an antenna assembly 250, and a network interface 260.

Processing unit 210 may include one or more processors, microprocessors, application specific integrated circuits (ASICs), field programmable gate arrays (FPGAs), and/or other processing logic. Processing unit 210 may control operation of base station 200 and its components.

Memory 220 may include a random access memory (RAM) or another type of dynamic storage device, a read only memory (ROM) or another type of static storage device, a removable memory card, and/or another type of memory to store data and instructions that may be used by processing unit 210.

User interface 230 may include mechanisms for inputting information to base station 200 and/or for outputting information from base station 200. Examples of input and output mechanisms might include a speaker to receive electrical signals and output audio signals; a microphone to receive audio signals and output electrical signals; buttons (e.g., a joystick, control buttons, a keyboard, or keys of a keypad) and/or a touchscreen to permit data and control commands to be input into base station 200; a display, such as an Liquid Crystal Display (LCD), to output visual information; and/or any other type of input or output device. In some embodiments, base station 200 may be managed remotely and may not include user interface 230. In other words, base station 200 may be "headless" and may not include an input device and/or an output device.

Communication interface 240 may include one or more Radio Frequency (RF) transceivers that enable base station 200 to communicate with mobile devices via wireless communications. An RF transceiver may include an RF transmitter that receives signals to be transmitted wirelessly and performs signal processing on the signals before providing the signals to antenna assembly 250, and an RF receiver that receives signals from antenna assembly 250 and performs signal processing on the received signals before providing the received signals to processing unit 210. For example, the RF transceiver may perform analog-to-digital and digital-to-analog conversion, modulation and demodulation, up-conversion and down-conversion, and/or amplification of signals.

Antenna assembly 250 may include one or more antennas to transmit and/or receive RF signals over the air. Antenna assembly 250 may, for example, receive RF signals from communication interface 240 and transmit the signals over the air and receive RF signals over the air and provide them to communication interface 240.

Network interface 260 may include a logical component that includes input and/or output ports, input and/or output systems, and/or other input and output components that facilitate the transmission of data to other devices via a backhaul link. For example, network interface 260 may include a network interface card (e.g., Ethernet card) for wired communications and/or a wireless network interface (e.g., a WiFi) card for wireless communications. Network interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As described herein, base station 200 may perform certain operations in response to processing unit 210 executing software instructions contained in a computer-readable medium, such as memory 220. A computer-readable medium may be defined as a non-transitory memory device. A non-transitory memory device may include memory space within a single physical memory device or spread across multiple physical memory devices. The software instructions may be read into memory 220 from another computer-readable medium or from another device via communication interface 240. The software instructions contained in memory 220 may cause processing unit 210 to perform processes that will be described later. Alternatively, hard-wired circuitry may be used in place of, or in combination with, software instructions to implement processes described herein. Thus, implementations described herein are not limited to any specific combination of hardware circuitry and software.

Although FIG. 2 shows example components of base station 200, in other implementations, base station 200 may include fewer components, different components, differently arranged components, or additional components than those depicted in FIG. 2. Additionally or alternatively, one or more components of base station 200 may perform the tasks described as being performed by one or more other components of base station 200.

Figure 3:
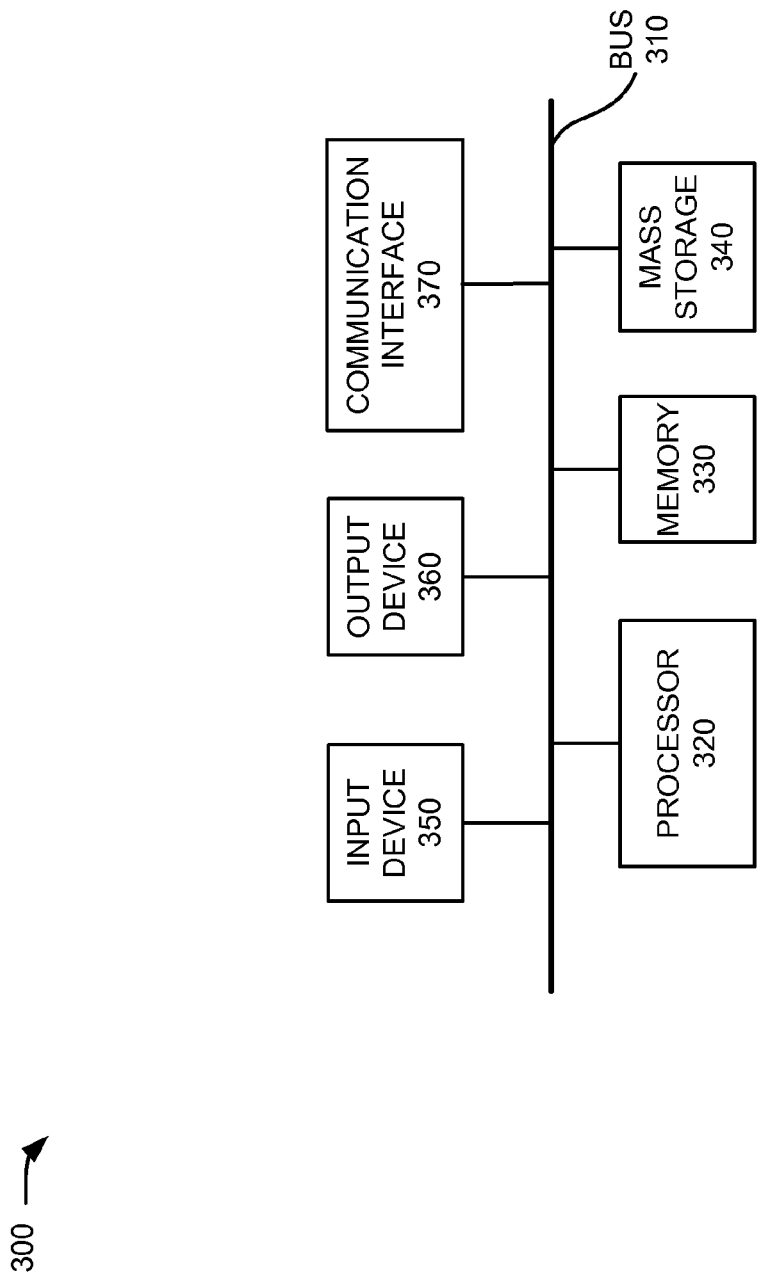
FIG. 3 is a block diagram showing exemplary components of a network device according to an embodiment.

FIG. 3 is a block diagram showing exemplary components of a network element 300, such as, for example, a PCRF 116, according to an embodiment. Network element 300 may include a bus 310, a processor 320, a memory 330, mass storage 340, an input device 350, an output device 360, and a communication interface 370.

Bus 310 includes a path that permits communication among the components of network element 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic. For example, processor 320 may be an x86 based CPU, and may use any operating system, which may include varieties of the Windows, UNIX, and/or Linux. Processor 320 may also use high-level analysis software packages and/or custom software written in any programming and/or scripting languages for interacting with other network entities are communicatively coupled to network 100.

Memory 330 may include any type of dynamic storage device that may store information and/or instructions, for execution by processor 320, and/or any type of non-volatile storage device that may store information for use by processor 320. For example, memory 330 may include a RAM or another type of dynamic storage device, a ROM device or another type of static storage device, and/or a removable form of memory, such as a flash memory. Mass storage device 340 may include any type of on-board device suitable for storing large amounts of data, and may include one or more hard drives, solid state drives, and/or various types of (RAID) arrays.

Input device 350, which may be optional, can allow an operator to input information into network element 300, if required. Input device 350 may include, for example, a keyboard, a mouse, a pen, a microphone, a remote control, an audio capture device, an image and/or video capture device, a touch-screen display, and/or another type of input device. In some embodiments, network element 300 may be managed remotely and may not include input device 350. Output device 360 may output information to an operator of network element 300. Output device 360 may include a display (such as an LCD), a printer, a speaker, and/or another type of output device. In some embodiments, network element 300 may be managed remotely and may not include output device 360.

Communication interface 370 may include a transceiver that enables network element 300 to communicate within network 100 with other devices and/or systems. The communications interface 370 may be configured for wireless communications (e.g., RF, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 370 may include a transmitter that converts baseband signals to RF signals and/or a receiver that converts RF signals to baseband signals. Communication interface 370 may be coupled to one or more antennas for transmitting and receiving RF signals. Communication interface 370 may include a logical component that includes input and/or output ports, input and/or output systems, and/or other input and output components that facilitate the transmission/reception of data to/from other devices. For example, communication interface 370 may include a network interface card (e.g., Ethernet card) for wired communications and/or a wireless network interface (e.g., a WiFi) card for wireless communications. Communication interface 370 may also include a universal serial bus (USB) port for communications over a cable, a Bluetooth® wireless interface, an RFID interface, an NFC wireless interface, and/or any other type of interface that converts data from one form to another form.

As described below, network element 300 may perform certain operations relating to server (e.g., PCRF, MME) and/or gateway operations when embodied as a gateway (e.g., SGW 112 and/or PGW 114), and/or providing user subscription and service information when embodied as an HSS 120. Network element 300 may perform these operations in response to processor 320 executing software instructions contained in a computer-readable medium, such as memory 330 and/or mass storage 340. The software instructions may be read into memory 330 from another computer-readable medium or from another device. The software instructions contained in memory 330 may cause processor 320 to perform processes described herein, such as, for example, process 800 depicted in FIG. 8. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of network element 300, in other implementations, network element 300 may include fewer components, different components, additional components, or differently arranged components than depicted in FIG. 3.

Figure 4:
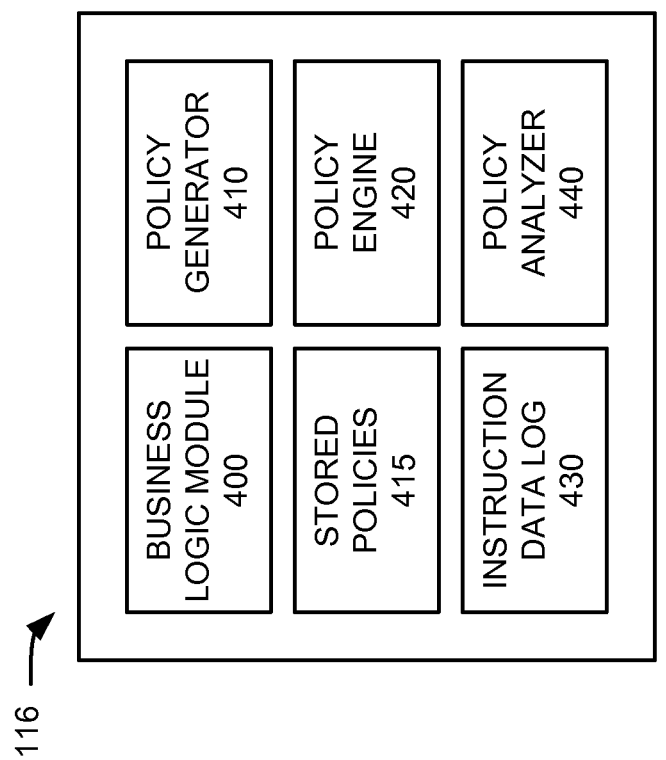
FIG. 4 is a block diagram illustrating exemplary functional components of the PCRF device of FIG. 1.

FIG. 4 is a block diagram illustrating exemplary functional components of PCRF 116. The functions described in connection with FIG. 4 may be performed by one or more components of device 300 (FIG. 3). As shown in FIG. 4, PCRF 116 may include a business logic module 400, a policy generator 410, stored policies 415, a policy engine 420, instruction data log 430, and a policy analyzer 440.

Business logic module 400 may receive business logic which can serve as the basis for machine-generated PCRF policies. In one implementation, business logic module 400 may include a user interface to solicit input in a structured format. The structured format may include, for example, input strings for subscriber profiles and output strings for bearer instructions that can be selected by a user (e.g., a network administrator). In another implementation, business logic module 400 may receive a file or table of business logic for PCRF policies. Via the user interface or a file submission, the user may specify the desired business logic as input for PCRF 116. In another implementation, the business logic may be provided as plain language by the user. In still another implementation, the business logic could be in the form of a table that lists various input parameter combinations, and then specifies the desired outcome. The business logic table may simply be an unordered list of scenarios, describing the desired network behavior for each scenario. It needs not imply any particular policy structure, but may simply serve as input to the actual policy creation process.

Figure 5:
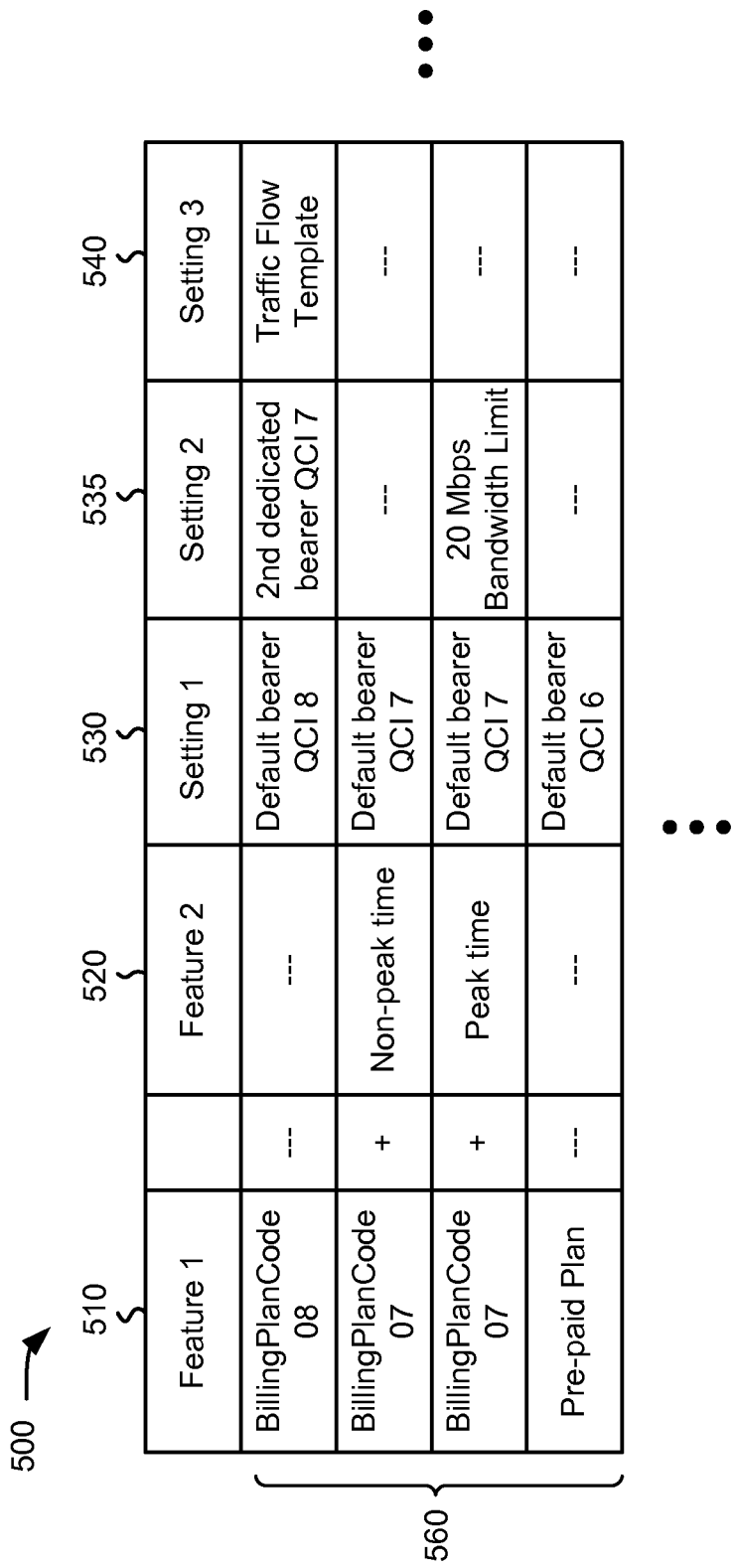
FIG. 5 is a diagram illustrating business logic input table for the business logic module of FIG. 5.

FIG. 5 provides a diagram illustrating a portion of a business logic input table 500 for the business logic module 400. Referring to FIG. 5, business logic input table 500 may include a one or more feature identifier fields 510/520, one or more setting fields 530/540, and a variety of entries 550 associated with each of fields 510-540. In table 500, each set of rows may correspond to a separate business logic input parameter.

Feature identifier fields 510/520 may include one or more features of a call that may have an impact on network behavior. Feature identifier fields 510/520 may include one (e.g., field 510), or two (e.g., field 520) or more features in combination, that may trigger particular network behavior. Features may include, for example, a service level for a subscriber (e.g. standard or higher QoS levels), a wireless plan type (e.g., pre-paid or post-paid), a type of network traffic (voice, types of data, etc.), a billing plan code associated with a subscriber that incorporates multiple subscriber parameters, etc. Setting fields 530/540 may include one or more network responses to a signaling message with the features in corresponding feature identifier fields 510/520. Setting fields 530/540 may include one (e.g., field 530), two (e.g., field 540), or more settings in combination to establish a bearer responsive to a particular UE 150 request.

For example, as shown in the top entry of FIG. 5, the business logic table could specify that when an enterprise subscriber with a particular billing code (e.g., "BillingPlanCode 08") attaches to the EPC network 110, the network will use a particular quality control indicator (e.g., "QCI 8") on the default bearer and will establish a second dedicated bearer (e.g., with QCI 7) and apply a specified Traffic Flow Template. The Traffic Flow Template may designate certain traffic for the subscriber for the default bearer and the second dedicated bearer.

Although FIG. 5 shows exemplary information that may be provided in table 500 for a business logic input, in other implementations, table 500 may contain less, different, differently-arranged, or additional information than depicted in FIG. 5. For example, table 500 may be replaced with a flat file structure with strings of features and settings in place of designated fields.

Returning to FIG. 4, policy generator 410 may use machine learning techniques to create policies based on input to business logic module 400. For example, policy generator 410 may identify plain language strings or operators from business logic module 400 to determine corresponding policy statements. In one implementation, policy generator 150 may digest the business logic table provided by business logic module 400 and may automatically create underlying policies for PCRF 116 to implement. Policy generator 410 may determine which tests to apply to incoming messages, and the order in which to apply them, to most efficiently implement the specified business logic. For example, policy generator 410 may create a series of "if/then" or "if/then/else" type statements to implement the specified business logic.

Policy generator 410 may output the machine-learned (or machine-generated) policies as stored policies 415. In one implementation, stored policies 410 may be stored in memory (e.g., memory 330 or mass storage 340) as a database, table, flat file structure, etc.

Policy engine 420 may access stored policies 415 to execute the policies in response to signal messages (e.g., from PGW 114) for UE 150 connection requests, handovers, etc. Policy engine 420 may, for example, communicate with PGW 114 (e.g., using Gx interface 124) to provide policies and/or policy decisions for new connection requests. Policy engine 420 may, for example, apply PCRF policies for thousands or millions of requests a day.

Instruction data log 430 may record instructions from PCRF 116 (e.g., policy engine 420) that are responsive to each connection request (e.g., from a UE 150). Instruction data log 430 may also record application of the decision logic to each connection request. For example, instruction data log 430 may track a sequence of policies (e.g., particular "if/then/else" statements) applied by policy engine 420 to arrive at a decision for a connection request. In one implementation, instruction data log 430 may log time of arrival (e.g., of a connection request) and the accompanying response sent back. Thus, for each instruction or decision responsive to a connection request, instruction data log 430 may maintain a record of the decision flow (e.g., the sequence of policies that were processed before identifying a response) and the resulting decision. Instruction data log 430 may store the ongoing log in a memory, such as memory 330 or mass storage 340.

Policy analyzer 440 may review instruction data log 430 for accuracy of policies and for opportunities for optimization of stored data policies 415. Accuracy of policies may include confirming that PCRF decisions/instructions conform to business logic input. Periodically, policy analyzer 440 may re-evaluate the business logic table in business logic module 400 and instruction data log 430 to verify that the correct response was sent for all connection requests; that is, to look for mistakes in stored policies 415, which can then be automatically corrected via updated policies. For example, policy analyzer 440 may detect if a particular decision results in selecting default setting instead of a more particular bearer setting indicated in business logic 400. Policy analyzer 440 may provide feedback to policy generator 410 or stored policies 415 to adjust stored policies 415 for accuracy or efficiency.

Policy analyzer 440 may attempt to optimize performance of PCRF 110. For example, policy analyzer 440 may identify whether the policy list can be structured more efficiently, such as changing the order of policies to improve processing efficiency. For example, the order of "if/then" statements in stored policies 415 may be adjusted to place the most-used policies first, in order to minimize the number of steps in a decision tree. Policy analyzer 440 may identify an order for the policy list that prioritizes the set of most-frequently selected policies. For example, policy analyzer 440 may use message statistics from instruction data log 430 to optimize stored policies 415 based on the frequency of particular types of requests or particular decisions. As a more particular example, if instruction data log 430 contains one hundred different scenarios, but five scenarios account for 90% of received traffic, then policy analyzer 440 can optimize the policies to handle those five scenarios most efficiently, increasing the overall network efficiency.

In another implementation, policy analyzer 440 may use collected message arrival times from instruction data log 430 to calculate time-of-day policies to further optimize the network efficiency. Since the frequency of certain scenarios may vary across the calendar day, policy analyzer 440 may tune the policies in stored policies 415 to be most efficient for the type of traffic that is expected to arrive at particular time periods. For example, during typical commuter hours, mobile handoffs may make up a higher percentage of policy decisions, whereas voice-over-IP policy decisions may be more prevalent during the typical work day period. Policy analyzer 440 may selectively alter stored policies 415 (or switch between differently tuned/optimized sets of stored policies) to accommodate the types of requests that may be more prevalent during particular periods of a calendar day. Thus, policy analyzer 440 may identify one set of most-frequently selected policies for a first recurring time period and apply the policies according to one order for stored policies 415 during the first recurring time period. Policy analyzer 440 may identify another set of most-frequently selected policies for a different recurring time period and apply the policies according to another order for stored policies 415 during that different recurring time period.

In still another implementation, policy analyzer 440 may use PCRF 116 processing time data, for each decision, to determine if a particular type of policy decision is inefficient (e.g., takes well above the average processing time). In other implementations, policy analyzer 440 may account for regional differences for different PCRFs 116. For example, stored policies 415 may be optimized differently to better accommodate subscriber profiles in different regions (e.g., based on variations in a predominant type of network activity for one regional PCRF 116 versus a different regional PCRF 116).

Policy analyzer 440 may conduct efficiency analyses or accuracy analyses at designated intervals (e.g., daily, weekly, etc.) or in response to reaching a particular data sample size (e.g., every million logged responses). In some implementations, policy analyzer 440 may use artificial intelligence or other programmed logic to log, store, and analyze PCRF decision statistics.

Figure 6:
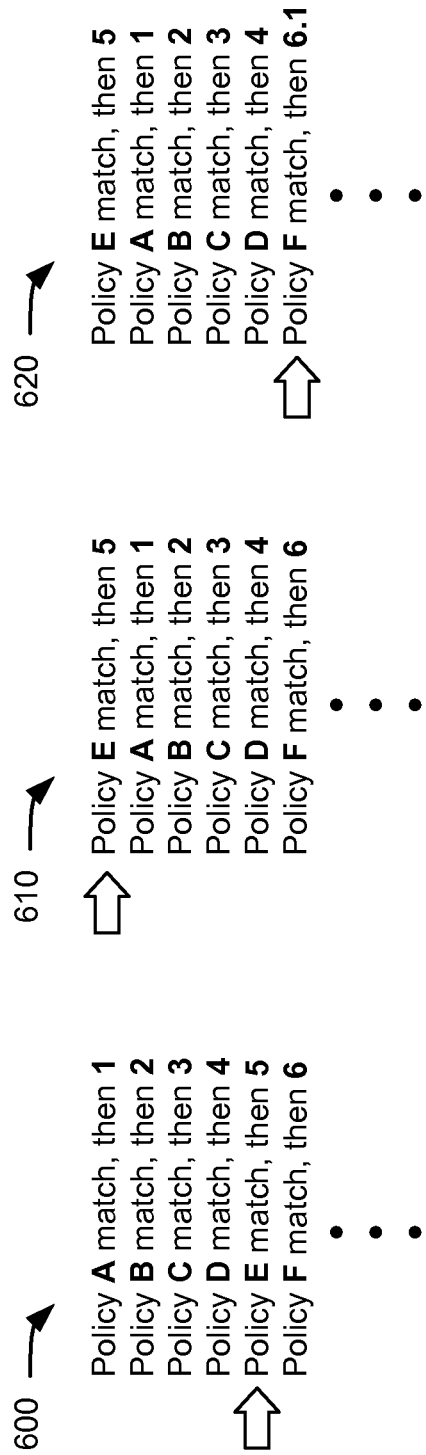
FIG. 6 is a diagram illustrating an exemplary policy optimization update and an exemplary policy accuracy update.

FIG. 6 provides a simplified illustration of policy adjustments for optimization and efficiency that may be detected and implemented by policy analyzer 440. As shown in FIG. 6, a portion 600 of an original stored policy list 415 may include a sequenced list of policy statements (e.g., "Policy A match, then 1," where A represents a particular condition and where 1 represents a particular instruction). Based on analysis of instruction data log 430, policy analyzer 440 may determine that the policy statement "Policy E match, then 5" is applied more frequently than the other policy statements. Thus, policy analyzer 440 may provide instructions to update (or re-sequence) the policy sequence as shown in portion 610, by moving the most-used policy statement (i.e., "Policy E match, then 5") to the top or beginning of the sequence policy list. Thus, policy engine 420 may apply the updated sequenced policy list 610 to more efficiently identify the more common instructions.

Still referring to FIG. 6, based on analysis of instruction data log 430, policy analyzer 440 may determine that the policy statement "Policy F match, then 6" fails to provide a bearer setting that is consistent with business logic 400. Thus, policy analyzer 440 may provide instructions to revise the policy sequence as shown in portion 620, by altering the inaccurate policy statement (i.e., from "Policy F match, then 6" to "Policy F match, then 6.1"). Thus, policy engine 420 may apply the revised policy list 620 to more accurately represent business logic 400.

Figure 7:
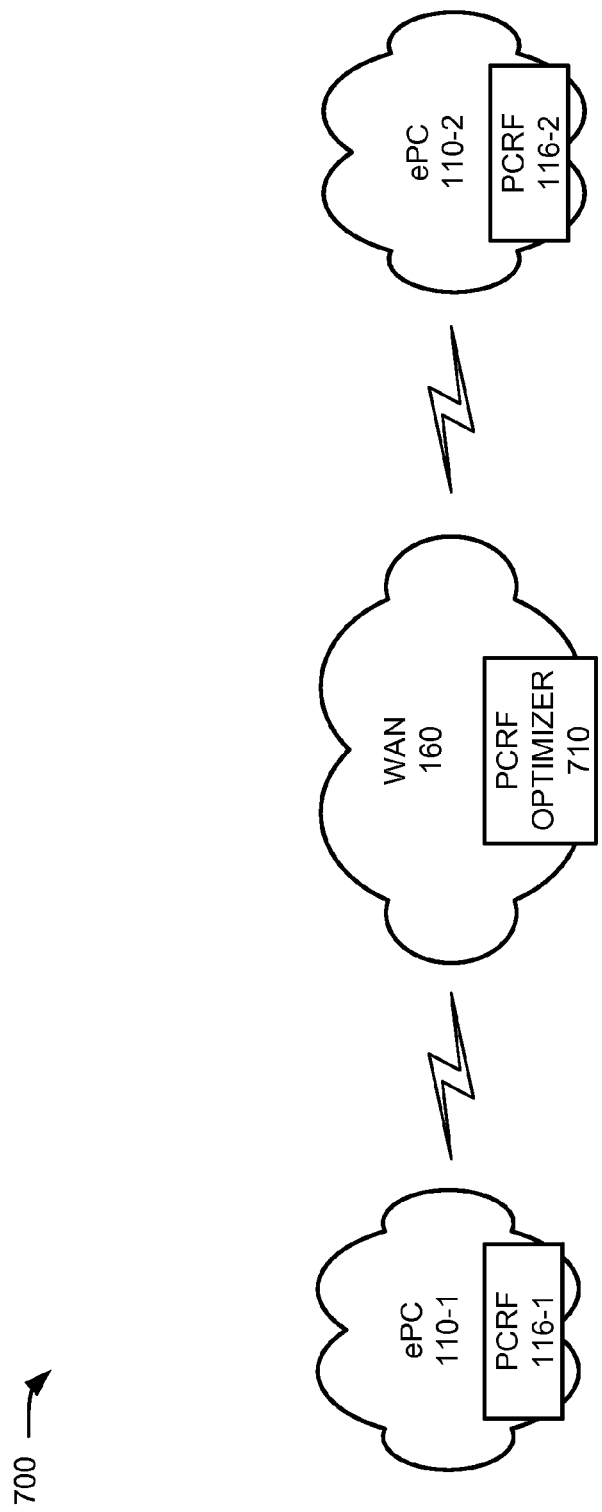
FIG. 7 is a block diagram of portion of the network of FIG. 1 according to another embodiment.

In one implementation, policy analyzer 440 may communicate with other PCRF devices 116 (e.g., in other EPC networks 110) to exchange and/or compare accuracy and/or optimization changes. FIG. 7 is a block diagram of portion 700 of network 100 according to exemplary embodiment. As shown in FIG. 7, network portion 700 may include EPC network 110-1, EPC network 110-2, and WAN 160. EPC network 110-1 and EPC network 110-2 may service different geographic regions. Each EPC network 110 may include a PCRF 116 and other components (not shown) described above in connection with FIG. 1.

In one implementation, PCRF 116-1 may use local statistics (e.g., from a local instruction data log 430 in PCRF 116-1) to optimize PCRF 116-1 performance. Similarly, PCRF 116-2 may use local statistics (e.g., from a local instruction data log 430 in PCRF 116-2) to optimize PCRF 116-2 performance. In another implementation, PCRF 116-1 and PCRF 116-2 may use WAN 160 (or another network connection) to communicate revisions for accuracy and/or optimization. For example, PCRFs 116 may be configured to maintain automatic optimizations locally but to share policy changes for accuracy.

In another implementation, WAN 160 may include a PCRF optimizer 710. PCRF optimizer 710 may include one or more network devices, server devices, or computing devices that may perform one or more functions of business logic module 400, policy generator 410, instruction data log 430, and/or policy analyzer 440. For example, the policy engine 420 in each PCRF 116 may provide log data to PCRF optimizer 710 to analyze, determine optimizations, verify accuracy, and update/revise stored policies 415. In one example, PCRF optimizer 710 may maintain separate data logs for each PCRF 116 and provide optimizations based on local data.

While FIG. 7 shows exemplary components of network portion 700, in other implementations, network portion 700 may include fewer components, different components, differently arranged components, or additional components than depicted in FIG. 1. For example, there may be several EPC networks 110.

Figure 8:
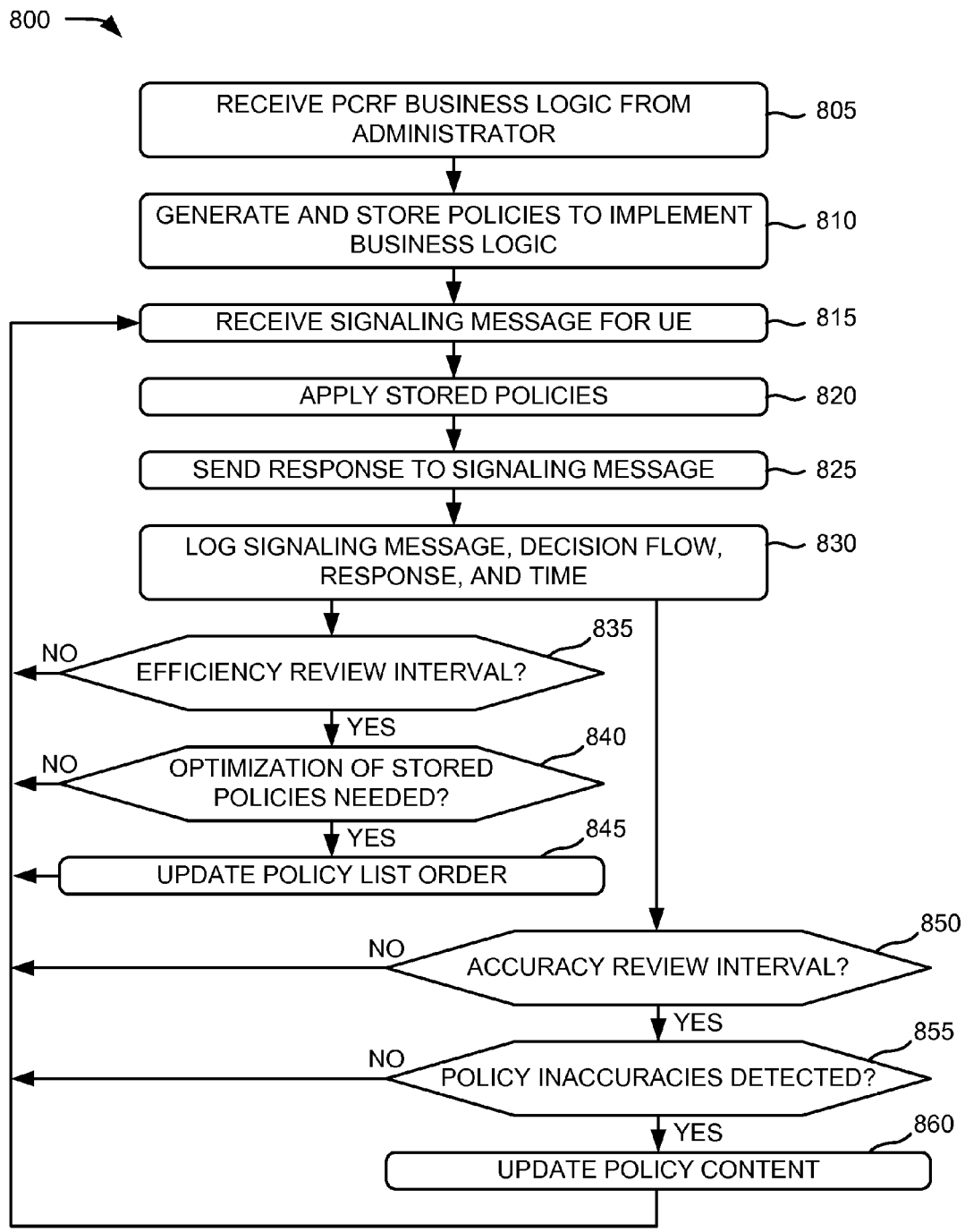
FIG. 8 is a flow chart showing an exemplary process for implementing machine-learned policies for a PCRF.

FIG. 8 provides a flow chart showing an exemplary process for implementing machine-learned policies for a PCRF. In one implementation, process 800 may be performed on a network device, such as PCRF 116. In another implementation, process 800 may be performed by PCRF 116 in conjunction with one or more other devices, such as PCRF optimizer 710.

Process 800 may include receiving PCRF business logic from a network administrator (block 805) and generating and storing policies to implement the business logic (block 810). For example, business logic module 400 of PCRF 116 may receive business logic which can serve as the basis for machine-generated PCRF policies. The business logic may be in the form of a table that lists various input parameter combinations for a connection request to EPC network 110, and then specifies the desired outcome for each input parameter combination. Policy generator 410 may use machine learning to create policies based on input to business logic module 400. For example, policy generator 410 may create a series of "if/then" or "if/then/else" type statements to implement the specified business logic. The policies may be stored in memory as a database, table, or flat file format.

Process 800 may further include receiving a signaling message for a UE (block 815), applying the stored policies (block 820), and sending a response to the signaling message (block 825). For example, PCRF 116 may receive a signaling message from PGW 114 for a particular UE 150. Policy engine 420 of PCRF 116 may access stored policies 415 to execute the policies in response to a UE 150 connection request, handoff, etc. Policy engine 420 may, for example, communicate with PGW 114 over Gx interface 124 to provide policies and/or policy decisions (e.g., based on stored policies 415) for the signaling message.

Process 800 may additionally include logging a message, decision flow, response, and time (block 830). For example, instruction data log 430 of PCRF 116 may record instructions from policy engine 420 that are responsive to each connection request. Instruction data log 430 may also record the decision logic applied to each connection request, such as the sequence of policies applied by policy engine 420 to arrive at a decision for the connection request. In one implementation, instruction data log 430 may log a time of arrival (e.g., of a connection request or corresponding signaling message from PGW 114) and the time of the accompanying response.

Process 800 may include determining if a periodic efficiency review interval has been reached (block 835). For example, policy analyzer 440 of PCRF 116 may determine if a periodic interval for conducting an efficiency review of instruction data log 430 occurs. The periodic interval may be set, for example, by a network administrator as a set time interval (e.g., daily, weekly, etc.). In another implementation, policy analyzer 440 may identify a period of historically slower network activity to conduct an efficiency review.

If a periodic efficiency review interval has not been reached (block 835—NO), process 800 may return to block 815 to receive signaling message for a new call. If a periodic efficiency review interval has been reached (block 835—YES), process 800 may include determining if optimization of the stored policies is needed (block 840). For example, policy analyzer 440 may review instruction data log 430 to identify an order of stored policies 415 that can improve processing efficiency (e.g., by placing most-used policies toward the beginning of the list in stored policies 415). Policy analyzer 440 may, for example, determine a number of policies (e.g., "if/then" statements) used to reach each decision. Optimization criteria may include, for example, reducing the overall number of steps policy engine 420 makes in applying stored policies 415. The optimization criteria may be applied for requests generally or for requests during a particular time period (e.g., peak use periods, morning periods, evening periods, etc.).

If no optimization of the stored policies is needed (block 840—NO), process 800 may return to block 815 to receive signaling message for a new call. If optimization of the stored policies is needed (block 840—YES), the policy list order may be updated (block 845). For example, policy analyzer 440 may re-sequence the list of policies in stored policies 415 or instruct policy generator 410 to re-sequence the list of policies in stored policies 415.

Process 800 may also include determining if a periodic accuracy review interval has been reached (block 850). For example, policy analyzer 440 of PCRF 116 may determine if a periodic interval for conducting an accuracy review of stored policies 415 (e.g., based on instruction data log 430 and business logic tables) occurs. The periodic interval for the accuracy review may be different (shorter, longer) and/or staggered from the periodic interval of the efficiency review interval of block 835. The periodic interval for the accuracy review may be set, for example, by a network administrator as a set time interval (e.g., daily, weekly, etc.). In another implementation, policy analyzer 440 may identify a period of historically slower network activity to conduct an accuracy review or conduct the accuracy review simultaneously with the efficiency review.

If a periodic accuracy review interval has not been reached (block 850—NO), process 800 may return to block 815 to receive signaling message for a new call. If a periodic accuracy review interval has been reached (block 850—YES), process 800 may include determining if policy inaccuracies are detected (block 855). For example, policy analyzer 440 may review instruction data log 430 to confirm that PCRF decisions/instructions conform to desired outcomes from business logic input.

If no policy inaccuracies are detected (block 855—NO), process 800 may return to block 815 to receive signaling message for a new call. If policy inaccuracies are detected (block 855—YES), the policy content may be updated (block 860). For example, policy analyzer 440 may change one or more of stored policies 415 or instruct policy generator 410 to change stored policies 415 so that the policy decision outputs will match the input business logic.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIG. 8, the order of the blocks may be modified in other embodiments. Further, non-dependent blocks may be performed in parallel.

Certain features described above may be implemented as "logic," a "module," or a "unit" that performs one or more functions. This logic, module, or unit may include hardware, such as one or more processors, microprocessors, application specific integrated circuits, or field programmable gate arrays, software, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise. The term "exemplary," as used herein means "serving as an example." Any embodiment or implementation described as "exemplary" is not necessarily to be construed as preferred or advantageous over other embodiments or implementations.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and the type of information. Storage and use of personal information may be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a Policy and Charging Rules Function (PCRF) device, business logic for PCRF policies;
    automatically generating, by the PCRF device, a policy list by applying machine learning to the business logic;
    receiving, by the PCRF device, signaling messages for user equipment;
    determining, by the PCRF device and based on the policy list, policy decisions that are responsive to each of the signaling messages;
    logging, by the PCRF device, a decision flow associated with each of the signaling messages and a corresponding policy decision;
    determining, by the PCRF device and based on the logging, if the policy list can be structured more efficiently; and
    automatically updating by the PCRF device, the policy list when the policy list can be structured more efficiently.

2. The method of claim 1, further comprising:
    determining, by the PCRF device and based on the logging and the business logic, if one or more policies in the policy list is not accurate; and
    automatically revising, by the PCRF device, the policy list when the policy list is not accurate.

3. The method of claim 2, wherein automatically revising the policy list includes changing the one or more policies in the policy list to create a revised policy list.

4. The method of claim 2, further comprising:
    sending, to another PCRF device, the revised policy list.

5. The method of claim 1, wherein automatically updating the policy list includes re-sequencing the policies in the policy list.

6. The method of claim 1, wherein determining if the policy list can be structured more efficiently includes:
    identifying a set of most-frequently selected policies, and
    identifying an order for the policy list that allows the PCRF device to process the signaling message first in relation to the set of most-frequently selected policies.

7. The method of claim 1, wherein the logging further includes:
    logging an amount of processing time for determining each of the policy decisions, and
    logging a time of day for each of the policy decisions.

8. The method of claim 1, wherein determining if the policy list can be structured more efficiently includes:
    identifying a first set of most-frequently selected policies for a first recurring daily time period;
    identifying, based on the first set, a first order for the policy list that allows the PCRF device to most-efficiently process the signaling messages during the first recurring daily time period;
    identifying a second set of most-frequently selected policies for a second recurring daily time period; and
    identifying, based on the second set, a second order for the policy list that allows the PCRF device to most-efficiently process the signaling messages during the second recurring daily time period.

9. The method of claim 1, wherein receiving business logic for the PCRF policies includes:
    receiving a data table of business logic, or
    soliciting user input for the business logic via a structured user interface.

10. A network device, comprising:
    an interface that communicates with a network;
    a memory configured to store instructions; and
    a processor, coupled to the interface and the memory, wherein the processor is configured to execute the instructions stored in the memory to:
        receive business logic for Policy and Charging Rules Function (PCRF) policies,
        automatically generate a policy list based on the business logic,
        receive signaling messages for user equipment,
        determine, based on the policy list, policy decisions that are responsive to each of the signaling messages,
        log a decision flow associated with each of the signaling messages and a corresponding policy decision,
        determine, based on the logging, if the policy list can be structured more efficiently, and
        automatically update the policy list when the policy list can be structured more efficiently.

11. The network device of claim 10, wherein the processor is further configured to execute the instructions stored in the memory to:

determine, based on the logging and the business logic, if one or more policies in the policy list is not accurate; and automatically revise the policy list when the policy list is not accurate.

12. The network device of claim 10, wherein the processor is further configured to execute the instructions stored in the memory to:

log an amount of processing time for determining the policy decision.

13. The network device of claim 12, wherein the processor is further configured to execute the instructions stored in the memory to:

store, in the memory, the decision flow and the amount of processing time.

14. The network device of claim 10, wherein the processor is further configured to execute the instructions stored in the memory to:

send, to another PCRF device, the updated policy list.

15. The network device of claim 10, wherein, when determining if the policy list can be structured more efficiently, the processor is further configured to execute the instructions stored in the memory to:

identify a set of most-frequently selected policies, and
identify an order for the policy list that prioritizes the set of most-frequently selected policies.

16. The network device of claim 10, wherein, when determining if the policy list can be structured more efficiently, the processor is further configured to execute the instructions stored in the memory to:

identify a first set of most-frequently selected policies for a first recurring time period;
identify, based on the first set, a first order for the policy list that prioritizes the first set of most-frequently selected policies during the first recurring time period;
identify a second set of most-frequently selected policies for a second recurring time period; and
identify, based on the second set, a second order for the policy list that prioritizes the second set of most-frequently selected policies during the second recurring time period.

17. A non-transitory computer-readable medium, storing instructions executable by one or more processors, the non-transitory computer-readable medium comprising one or more instructions to:

receive business logic for Policy and Charging Rules Function (PCRF) policies;
automatically generate a policy list based on the business logic;
receive signaling messages for user equipment;
determine, based on the policy list, policy decisions that are responsive to each of the signaling messages;
log a decision flow associated with each of the signaling messages and a corresponding policy decision;
determine, based on the logging, if the policy list can be structured more efficiently; and
automatically update the policy list when the policy list can be structured more efficiently.

18. The non-transitory computer-readable medium of claim 17, further comprising one or more instructions to:
provide, to a gateway device responses, that include the policy decisions.

19. The non-transitory computer-readable medium of claim 17, further comprising one or more instructions to:
determine, based on the logging and the business logic, if one or more policies in the policy list is not accurate; and
automatically revise the policy list when the policy list is not accurate.

20. The non-transitory computer-readable medium of claim 17, further comprising one or more instructions to:
log an amount of processing time for determining each of the policy decisions, and
store, in a memory, the decision flow and the amount of processing time for each of the policy decisions.

* * * * *